United States Patent [19]

Berry

[11] Patent Number: 4,710,364

[45] Date of Patent: Dec. 1, 1987

[54] CONTINUOUS RECOVERY OF SULFUR OXIDE FROM FLUE GAS

[75] Inventor: W. Wes Berry, Lakeland, Fla.

[73] Assignee: Advanced Separation Technologies Incorporated, St. Petersburg, Fla.

[21] Appl. No.: 905,512

[22] Filed: Sep. 10, 1986

[51] Int. Cl.$^4$ .......................... B015 8/00; C01B 17/00; C01B 17/48; C05B 11/04

[52] U.S. Cl. .................................... 423/244; 423/522; 423/539; 71/37; 71/40

[58] Field of Search .......... 423/242 A, 242 R, 244 A, 423/244 R, 539, 522; 71/37, 40

[56] References Cited

U.S. PATENT DOCUMENTS

| | | | |
|---|---|---|---|
| 3,363,401 | 1/1968 | Jean-Pierre et al. | 423/244 |
| 3,391,996 | 7/1968 | Van Dijk et al. | 423/320 |
| 3,519,387 | 7/1970 | Henderson | 423/320 X |
| 3,907,970 | 9/1975 | Boening | 423/242 |
| 4,073,634 | 2/1978 | Pircon et al. | 423/242 X |
| 4,122,150 | 10/1978 | Hori et al. | 423/242 |
| 4,522,726 | 6/1985 | Berry et al. | 210/660 |

Primary Examiner—Gregory A. Heller
Attorney, Agent, or Firm—Burns, Doane, Swecker & Mathis

[57] ABSTRACT

A process for removing sulfur dioxide from flue gas is disclosed. After passing through a precipitator to remove particulate material, the flue gas is conducted continuously through a fixed bed solid-gas contacting device containing activated carbon or natural zeolite. The bed is regenerated continuously, thereby producing sulfuric acid which may be mixed with ground phosphate rock to produce normal superphosphate, or other by-products.

11 Claims, 3 Drawing Figures

4,710,364

CONTINUOUS RECOVERY OF SULFUR OXIDE FROM FLUE GAS

FIELD OF THE INVENTION

This invention relates to the continuous removal and recovery of sulfur dioxide from gas streams such as flue gas from fossil fuel power plants, industrial boilers and smelters.

BACKGROUND OF THE INVENTION

Flue gases from fossil fuel power plants contain sulfur primarily in the form of sulfur dioxide. Since sulfur dioxide is harmful to the environment, it is necessary to remove this pollutant from the flue gas before it passes into the atmosphere. Various processes have been proposed for the removal of sulfur dioxide from flue gases, including both wet and dry processes.

In a typical wet adsorption process, the flue gas is washed with an aqueous alkaline solution or slurry. Aqueous slurries of calcium oxide, calcium hydroxide or calcium carbonate have been used for removal of sulfur dioxide from flue gas. Other wet adsorption processes utilize an aqueous solution of soluble alkali such as sodium carbonate or sodium hydroxide to form sulfite and sulfate in solution. Although wet adsorption processes are effective in removing sulfur dioxide from flue gas, they suffer from the disadvantage of producing a liquid effluent containing a large amount of water relative to the sulfur dioxide adsorbed, so that the sulfur values cannot be economically and efficiently recovered from the aqueous solution. Another disadvantage of the wet scrubbing systems for flue gas desulfurization is the requirement for substantial quantities of make-up water for operation of the system. Suitable quality water is often available at the power plant only in limited quantities, which makes it necessary to reuse the water in the system.

In order to reduce the requirements for water, and to overcome the slurry disposal problems, dry sulfur dioxide removal processes have been proposed. In prior art dry processes, various methods are used to reduce the oxides by reaction with ammonia, hydrocarbons, carbon monoxide or hydrogen. These reducing agents are reacted with the flue gas in a precipitator to cause the sulfur removal to occur.

As indicated previously, the current state of the art relies heavily on discard-type scrubbing systems, i.e., treatment of the $SO_2$ gas with lime or limestone in a wet scrubbing circuit, or alternatively, injection of alkali salts into the dry gas stream with subsequent particulate removal in a fabric-type bag house. The wet scrubbing techniques, if of the disposable reagent type, consume considerable amounts of energy and require large and expensive waste ponds for the storage of the spent solids.

There are also certain regenerable wet scrubbing techniques which utilize alkali salts, such as sodium hydroxide, as the make-up reagent. These systems remove the $SO_2$ as a sulfite compound and are then thermally regenerated to remove the $SO_2$ and prepare the solution for recycle. Again, these systems require the gas stream to be cooled to its saturation point which results in a considerable temperature reduction of the gas stream. Further, most of the regenerable systems require some sort of purge due to the oxidation of the sulfite solutions. Thus, the system is not totally closed, and the make-up alkali chemicals are generally considered expensive relative to the value of the $SO_2$.

OBJECTS AND SUMMARY OF THE INVENTION

In view of the problems associated with prior desulfurization processes, as described above, it is an object of this invention to provide a process in which sulfur dioxide is efficiently and effectively removed from flue gas.

It is a further object of this invention to provide a system in which sulfur removed from flue gas is efficiently disposed of by conversion to a useful product, namely, a usable fertilizer product.

Another object of this invention is to provide a desulfurization process that can be readily installed in existing flue gas pollution-control systems with a minimum of additional expense.

These objects are accomplished in accordance with preferred embodiments of the invention by a process wherein the flue gas is conducted first through a precipitator to at least partially remove fly ash and other particulate material while allowing the flue gas containing sulfur dioxide to pass through the precipitator. The flue gas then passes through an adsorption device. In one embodiment of the invention, the adsorption device includes a plurality of individual chambers containing adsorption particles, such as activated carbon, so that the sulfur dioxide is retained on the particles as it passes with the flue gas through the chambers. An example of such an adsorption device is disclosed in U.S. Pat. No. 4,522,726, issued June 11, 1985. The gas from the chambers may then be conducted to the atmosphere through the stack, or otherwise disposed of. The sulfur on the carbon particles in the chamber is washed with water in a cyclic manner to provide a substantially continuous stream of weak sulfuric acid. The sulfuric acid is concentrated by means of steam, and is then mixed with granulated phosphate rock to produce normal superphosphate, which is an excellent fertilizer.

In another embodiment of the invention, the flue gas, after passing through the precipitator, passes through an adsorption chamber containing particles of activated natural zeolite to adsorb the sulfur dioxide. The chambers then pass in a cyclic manner through a thermal regeneration zone. The heat applied to the zeolite causes the sulfur dioxide to be desorbed from the zeolite in a continuous stream. The sulfur dioxide can then be converted to sulfuric acid using conventional technology employing oxidation catalysts such as vanadium pentoxide, or can be liquified. The sulfuric acid can then be sold or mixed with the ground phosphate rock, as explained above, to produce normal superphosphate. Liquid sulfur dioxide would typically be sold as a by-product.

In other embodiments of the invention, other regenerable sulfur dioxide sorbants, such as clinoptilolite, alumina-deficient mordenite, or alkalized alumina may be used.

DETAILED DESCRIPTION OF THE DRAWINGS

These preferred embodiments of the invention are illustrated in the accompanying drawings, in which.

DESCRIPTION OF THE PREFERRED EMBODIMENTS

Figure 1:
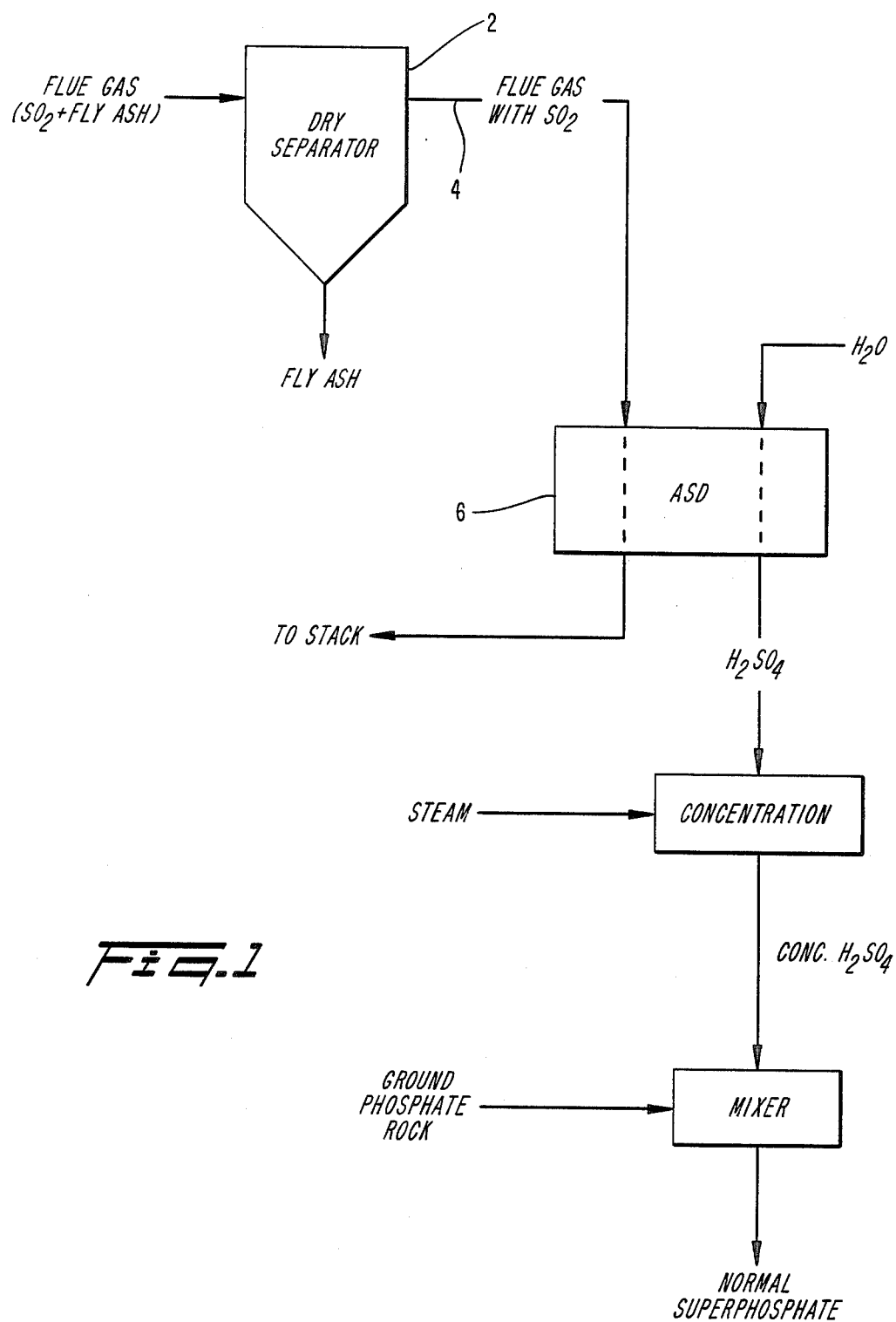
FIG. 1 is a simplified flow sheet of the first embodiment employing activated carbon.

Referring to FIG. 1, a typical fossil fuel power plant produces flue gas at a temperature of about 300° F. Typically, the flue gas contains oxides of sulfur, which are primarily in the form of sulfur dioxide. The flue gas also contains fly ash and other particulate matter. In many cases, power plants have electrostatic precipitators or fabric bag houses in order to remove the particulate matter from the flue gas before it is discharged into the atmosphere. A conventional cyclone separator 2 is illustrated schematically in FIG. 1. An electrostatic precipitator or mechanical filter may also be used instead of, or in addition to, the cyclone separator 2. The separator or precipitator receives the flue gas and discharges fly ash and other particulate matter at the bottom, while allowing the gas component with the sulfur dioxide to pass into the conduit 4. The low particulate flue gas is conducted to an advance separation device (ASD), which is illustrated and described in my copending patent application Ser. No. 713,492 filed Mar. 19, 1985, which is incorporated herein as if fully set forth.

Figure 2:
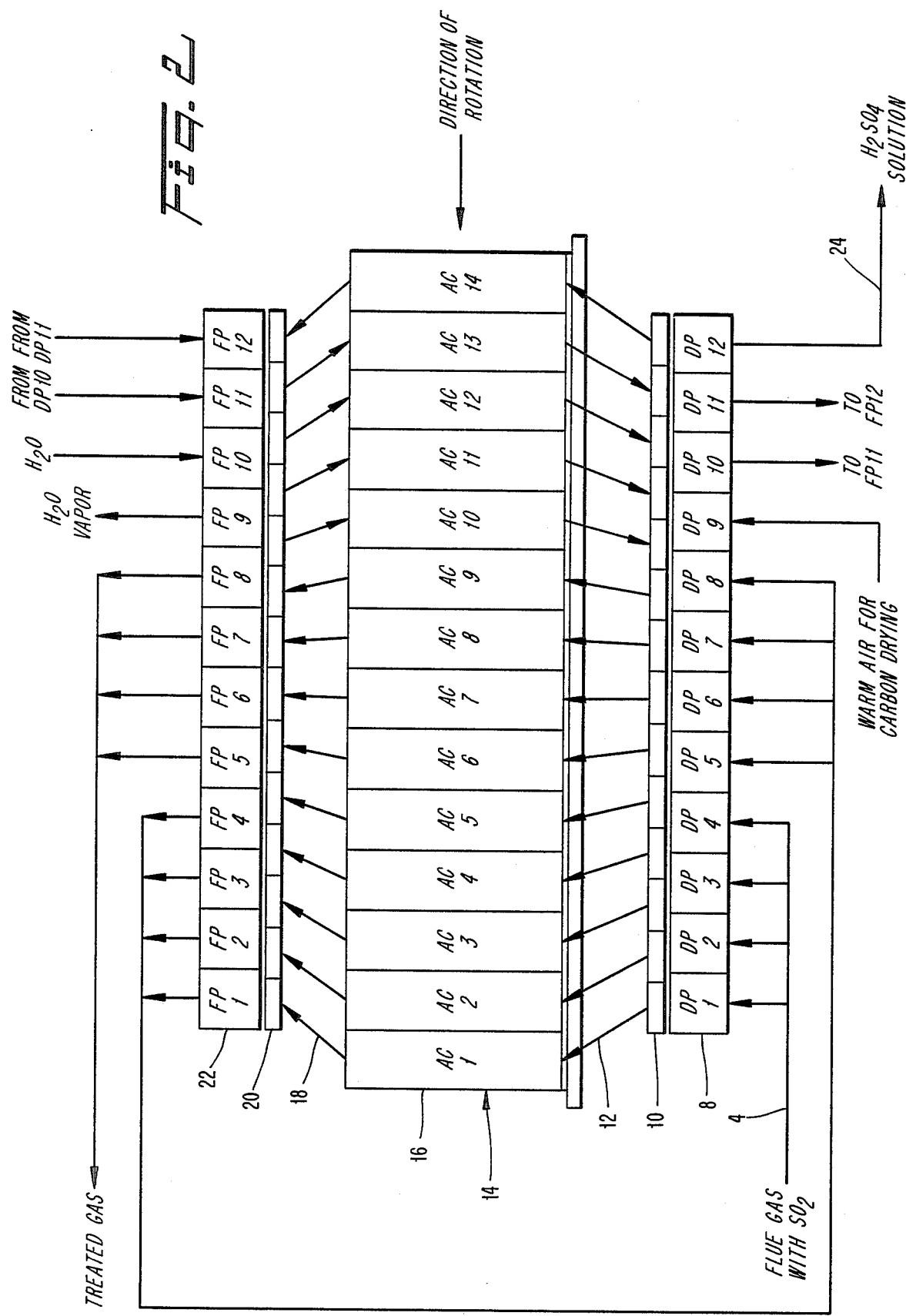
FIG. 2 is a schematic view of the adsorption chambers and feed ports of the advanced separation device as used in the process of FIG. 1.

The operation of the ASD is shown schematically in FIG. 2. In the ASD, there are arranged a plurality of adsorption chambers for rotation about a fixed vertical axis. The individual chambers of the ASD are filled with activated carbon. The flue gas with $SO_2$ is conducted in sequence through the carbon-filled chambers. The temperature of the gas entering the ASD system should be between 200 and 300 F. The sulfur-bearing flue gas preferably flows upwardly through the chambers of the ASD to avoid plugging with particulate solids. The flow is adjusted in order to load the carbon with an amount of sulfur dioxide approaching the equilibrium value achievable at the local temperature, while at the same time achieving a low sulfur dioxide content in the treated gas discharged from the ASD. Typically, two stages of contact are utilized to ensure that these criteria are met.

The carbon, after being loaded with sulfur dioxide, is transferred to a regeneration zone in the ASD where water flows through the adsorption chambers in a countercurrent direction. Due to the nature of sulfur dioxide adsorption on carbon and the catalytic activity achieved, washing the carbon with water results in the production of weak sulfuric acid. By using a countercurrent washing technique, and by maximizing the initial sulfur dioxide loading on the spent carbon, a stronger sulfuric acid material can be produced. The resulting sulfuric acid after carbon stripping ranges from 10% to 25% sulfuric acid ($H_2SO_4$) by weight.

The regenerated, moist carbon then enters a drying zone to remove residual moisture. The amount of water evaporated in this drying operation is extremely small relative to the overall gas flow. The dry carbon then reenters the adsorption zone to recover additional sulfur from the flue gas.

Referring to FIG. 2, the schematic arrangement of the ASD is illustrated. The low particulate flue gas containing sulfur dioxide is conducted through the conduit 4 to the discharge ports 8 which are designated DP1, DP2, DP3 and DP4 in FIG. 2. Through the valve interface 10 and the value-to-chamber conduits 12, the gas flows to the rotating carrousel 14 on which the adsorption chambers 16 are mounted. The activated carbon is contained in the chambers 16, and the sulfur dioxide is adsorbed on the surface of the carbon particles as the gas flow upwardly through the chambers AC1–AC5, as shown in FIG. 2. From the chamber 16, the gas flows through the valve-chamber conduits 18 and the valve interface 20 to the feed ports 22 designated FP1–FP4.

From the feed ports, the gas flows around to the discharge ports 8 which are designated DP5–DP8, where the gas passes through the carbon-filled chambers AC6–AC9. The treated gas with a substantial portion of the sulfur dioxide removed flows out of the feed ports 22 which are designated FP5–FP8. As the carrousel 14 of the ASD continues to rotate from right to left as viewed in FIG. 2, the adsorption chamber designated AC1 moves to the position occupied by the chamber AC14 in FIG. 2. Water is conducted through the feed port FP10 where it flows through the valve interface and the valve chamber conduits 18 and through the chambers designated AC11 and AC12, and from these chambers, the wash water is collected and passes through the discharge port designated DP10, from which it is conducted through an exterior pipe to the feed port designated FP11. The wash water flows in a similar fashion from feed port FP11 to discharge port DP11, and then to feed port FP12 and through adsorption chamber designated AC14 to the discharge port DP12. In each pass through the adsorption chambers, the water picks up progressively more sulfuric acid so that the liquid discharging from the port designated DP12 is in the form of weak sulfuric acid. Preferably, the concentration of the sulfuric acid is from 10–25% by weight.

Since the adsorption chambers are washed progressively as they move from right to left, as viewed in FIG. 2, there is less sulfuric acid on the carbon in the chamber designated AC12 than on the carbon in the chamber designated AC14. In order to preheat the carbon and assure maximum water drainage, warm air or steam is conducted through the discharge port DP9 and flows through the chamber designated AC10 and out through the feed port designated FP9. Actually, the amount of water evaporated in this step is extremely small relative to the overall gas flow. The carbon in the chambers is essentially dry when it reenters the adsorption zone, and it is prepared to recover additional sulfur in subsequent passes of the flue gas.

The weak sulfuric acid is pumped through a conduit 24 to a conventional evaporation system wherein the sulfuric acid is concentrated to approximately 93–98% $H_2SO_4$. This concentrated acid is mixed with ground phosphate rock using conventional mixing equipment such as that normally associated with the production of normal superphosphate. This sulfuric acid/phosphate rock mix is then cured and then granulated to produce a normal superphosphate product, which is a conventional fertilizer material. The normal superphosphate is used in the agricultural industry to provide phosphate as well as sulfur fertilizer values.

It is well known that numerous agricultural regions throughout the world, for example the United States, are experiencing various levels of sulfur deficiencies in the soils. To remedy this situation, many farmers purchase expensive sulfur supplements which, of course, add additional cost to the production of food materials. By incorporating the sulfur in normal superphosphate material, the sulfur values, which currently contribute to numerous environmentally-related problems, are converted to a solid form which can be advantageously utilized and, indeed, are critical for the production of agricultural commodities. In this manner, a detrimental waste problem is converted to a usable commodity.

Figure 3:
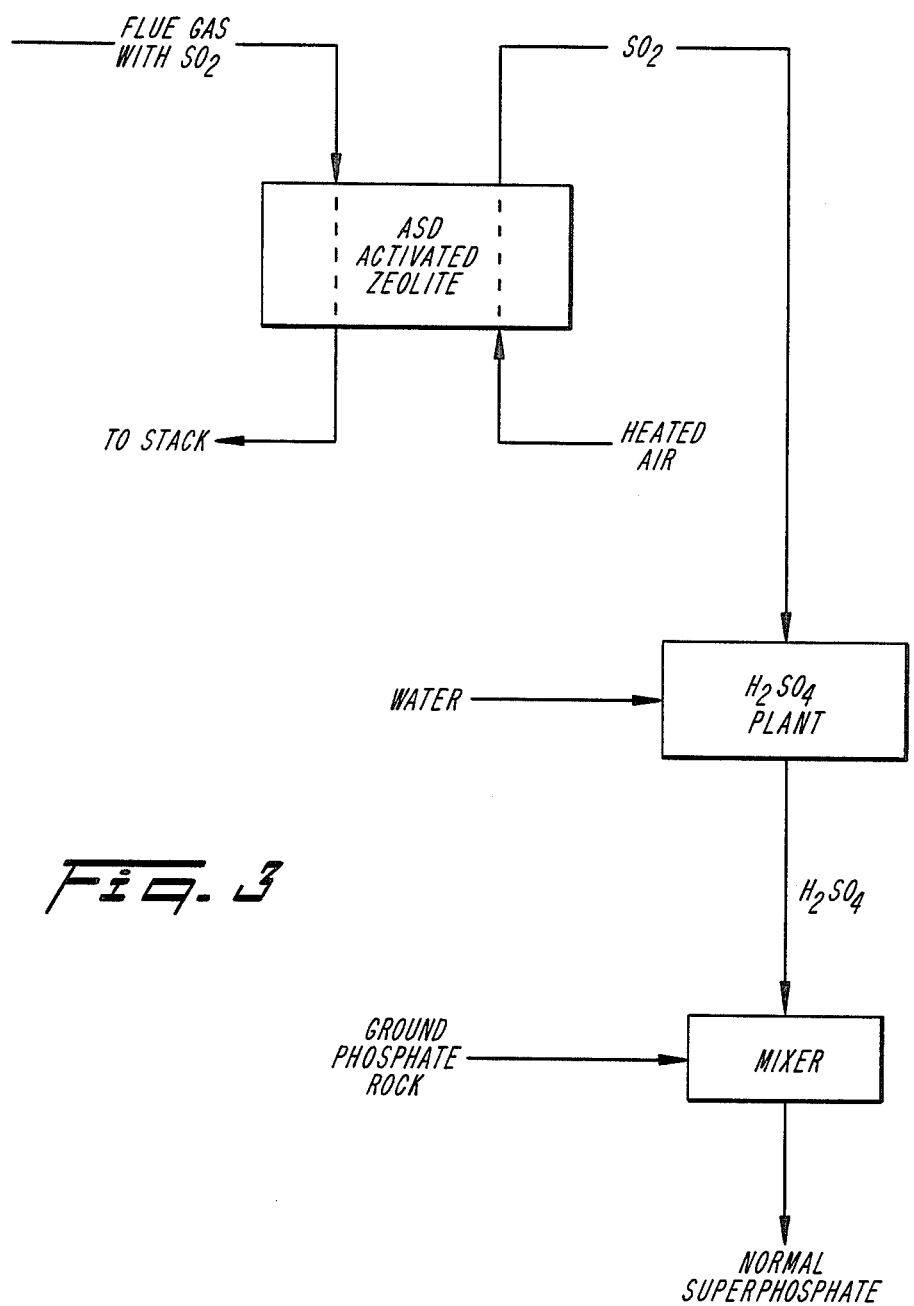
FIG. 3 is a flow sheet of the second embodiment of this invention employing activated natural zeolite.

The flow diagram of a second embodiment of this invention is shown in FIG. 3. In this embodiment, an activated natural zeolite, such as clinoptilolite, serves as the sorbent instead of activated carbon. The $SO_2$ is adsorbed on the zeolite in the same manner as described above for the carbon process, but at a temperature of about 300 F. Further, due to the nature of the zeolite, the $SO_2$ is not catalytically converted to $H_2SO_4$, thus it is present as an adsorbed species. Due to the rotation of the carrousel of the ASD, the loaded zeolite is then transferred to a thermal regeneration zone, instead of an aqueous wash zone as described in the carbon process. A desorption gas, preferably air at a temperature between 400 and 700 F., is conducted through the chambers by a counter-current flow. The relative concentration of $SO_2$ in the desorption gas stream discharged from the ASD would range from 6 to 8 percent by volume in the desorption gas, depending on the temperature and flow rate of the desorbing gas.

The desorption gas stream from the ASD is then conducted to a conventional processing facility for conversion to either sulfur dioxide (liquid) or sulfuric acid. If converted to sulfuric acid, such as by a conventional catalytic conversion process, the $H_2SO_4$ would be utilized as a feed to the normal superphosphate operation as described with regard to the embodiment of FIG. 1. If the material is recovered as liquified $SO_2$, it could be sold as a by-product. The regenerated zeolite enters a cooling step where cooling air flows through the chamber to reduce the temperature to about 300 F. Upon continued rotation of the carrousel, the chambers are then transferred into the $SO_2$ adsorption zone, and the cycle is repeated.

As indicated, the entire process is carried out continuously, thus maximum loading of the adsorbent is achieved while at the same time, the $SO_2$ content of the treated gas is reduced to the desired level.

The activated carbon adsorbent used in the chambers of the ASD is preferably Calgon PCB carbon either of a mesh size 6×16 or 16×28, or Anderson Super A in powder form or mesh size 16×28. It has been found that the Calgon carbon adsorbs considerably more sulfur than the Anderson carbon for similar diameter particles. Of the two particle sizes for both types of activated carbon, it was found that the larger particles adsorbed less sulfuric acid than the smaller particles. Based on these observations, it is preferable that the smaller diameter particles be used for optimum results.

In addition to activated carbon, other adsorption materials may be used, including clinoptilolite, mordenite and alkalized alumina. It has been found that clinoptilolite adsorbs about 10 times (by weight) as much water as sulfur dioxide under flue gas conditions. Tests were also conducted using clinoptilolite and mordenite that had been subjected to acid treatment to remove alumina to reduce intra-particle mass transfer resistance by opening the pore structure. Alkalized alumina was also subjected to testing.

In the process of this invention, where time until breakthrough for given bed volume and flow rate is the criterion by which sorbents are judged, the higher the Gangwal adsorption number, the more effective the sorbent material is. The following table sets forth the Gangwal adsorption number for various materials:

TABLE I

Gangwal Adsorption Numbers* for 100 ppm Breakthrough

| | Adsorption Number |
|---|---|
| Calgon PCB Carbon | |
| 6 × 16 mesh: | 1316 |
| after regeneration: | 367 |
| 16 × 28 mesh: | 2140 |
| Anderson Super A Carbon Powder | |
| 16 × 28 mesh (AX-31): | 60 |
| Powder (AX-21): | 524 |
| Clinoptilolite | |
| (Activated at 500° C.) 4 × 8 mesh: | 381 |
| 250° C. regeneration for 3 hours: | 218 |
| 150° C. regeneration: | 109 |
| Heat to 250° C. and cool down: | 163 |
| Acid treated | <55 |
| Alumina-deficient mordenite | 63 |
| Alkalized Alumina | |
| 16 × 28 mesh: | 4030 |
| air regenerated at 250° C.: | 2910 |

*Gangwal adsorption number is defined as:
$$\frac{Q_0 t}{V},$$
where:
$Q_0$ = volumetric flow rate, cm$^3$/min
$t$ = time for 100 ppm $SO_2$ breakthrough, min
$V$ = bed volume, cm$^3$
*Based on wet volumetric flow rates at standard conditions (1 atm., 0° C.)
CHALLENGE GAS
2060 ppm $SO_2$
3.4% $O_2$
6.2% $H_2O$
12.3% $CO_2$
balance $N_2$ It is obvious that conversion of a waste material to a usable product, if conducted economically, is a preferred method for treating waste-bearing streams. Much of the current technology, for example, lime or limestone scrubbers, dry scrubbers and the like, merely convert the gas phase sulfur dioxide to a solid which is also considered to be a waste and must be disposed of.

The process of this invention recovers the $SO_2$ as a usable product. In addition, the energy requirements for the overall process are lessened since the gas is treated at a higher temperature, thus cooling and reheat requirements are minimized. Further, by using a continuous, countercurrent shallow bed adsorption system, the system pressure drop is held to a minimum which again minimizes energy requirements.

Finally, by utilizing the ASD system, adsorbents which may be usable for $SO_2$ recovery but which are fragile or abrade easily can now be employed. Even though a continuous process operation is achieved, the actual adsorbent experiences little degradation or movement due to the nature of the ASD design. Thus, adsorbent make-up requirements are held to a minimum.

It is also apparent that the process of this invention allows for higher sulfur coals to be utilized in power plant control situations. Indeed, analysis indicates that higher sulfur contents in the coal will result in lower overall $SO_2$ recovery costs, since the by-product sulfur compound is a saleable product as opposed to a waste solid.

While this invention has been illustrated and described in accordance with certain preferred embodiments, it is recognized that variations and changes may be made therein, without departing from the invention, as set forth in the claims.

What is claimed is:

1. A process for removing sulfur dioxide from flue gas, comprising:
    (i) arranging a plurality of adsorption chambers for rotation about a fixed vertical axis, said chambers containing adsorption particles capable of absorbing sulfur dioxide and of desorbing sulfuric acid when contacted with water;
    (ii) conducting flue gas containing sulfur dioxide and particulate material through a precipitator to at least partially remove said particulate material, while allowing flue gas containing sulfur dioxde to pass through the precipitator;
    (iii) conducting said flue gas containing sulfur dioxide through a first fixed port and through said chambers containing said adsorption particles in sequence while said chambers are rotating about said fixed axis and adsorbing sulfur dioxide on the surface of adsorption particles
    (iv) regenerating said adsorption particles by conducting water through a second fixed port and through said chambers in sequence after said flue gas conducting step to produce and desorb sulfuric acid from said adsorption particles in the form of weak sulfuric acid;
    (v) discharging said flue gas from said chambers before said regenerating step (iv), and subsequently;
    (vi) discharging said sulphuric acid from said chambers; and
    (vii) mixing said sulfuric acid with ground phosphate rock to produce normal superphosphate.

2. The process according to claim 1, wherein said adsorption particles are activated carbon.

3. The process according to claim 1, wherein said step (iii) includes conducting said flue gas upwardly through said first fixed port and through said chambers while simultaneously conducting said water in step (iv) through said second fixed port and through said chambers.

4. A process for removing sulfur dioxide from flue gas, comprising:
    (i) arranging a plurality of adsorption chambers for rotation about a fixed vertical axis, said chamber containing activated natural zeolites or alkalized alumina;
    (ii) conducting flue gas containing sulfur dioxide and particulate material through a precipitator to at least partially remove said particulate material, while allowing flue gas containing sulfur dioxide to pass through the precipitator;
    (iii) conducting said flue gas containing sulfur dioxide through a first fixed port and through said chambers containing said activated natural zeolites or said alkalized alumina in sequence while said chambers are rotating about said fixed axis and adsorbing sulfur dioxide on the surface of said activated natural zeolite or said alikalized alumina;
    (iv) regenerating said acivated natural zeolite or said alkalized alumina by conducting heated air through a second fixed port and through said chambers in sequence after said flue gas conducting step (iii) to desorb sulfur dioxide gas from said activated natural zeolite or said alkalized alumina;
    (v) discharging said flue gas from said chambers before said regenerating step (iv), and subsequently;
    (vi) discharging said sulfur dioxide gas from said chambers;
    (vii) converting said sulfur dioxide gas to sulfuric acid; and
    (viii) mixing said sulfuric acid with ground phosphate rock to produce normal superphosphate.

5. The process according to claim 4, wherein said zeolite is clinoptilolite.

6. The process according to claim 4, wherein said chamber contains alkalized alumina.

7. The process according to claim 4, wherein said step (iii) includes conducting said flue gas upwardly through said first fixed port and through said chambers while simultaneously conducting said air in step (iv) through said second fixed port and through said chambers.

8. A process for removing sulfur dioxide from flue gas comprising:
    (i) arranging a plurality of adsorption chambers for rotation about a fixed vertical axis, said chambers containing activated natural zeolites or alkalized alumina;
    (ii) conducting flue gas containing sulfur dioxide and particulate material through a precipitator to at least partially remove said particulate material, while allowing flue gas containing sulfur dioxide to pass through the precipitator;
    (iii) conducting said flue gas containing sulfur dioxide through a first fixed port and through said chambers containing said activated natural zeolites or said alkalized alumina in sequence while said chambers are rotating about said fixed axis and adsorbing sulfur dioxide on the surface of said activated natural zeolites or said alkalized alumina;
    (iv) regenerating said activated natural zeolite or said alkalized alumina by conducting heated air through a second fixed port and through said chambers in sequence after said flue gas conducting step (iii) to desorb sulfur dioxide gas from said activated natural zeolite or said alkalized alumina;
    (v) dicharging said flue gas from said chambers before said regenerating step (iv), and subsequently;
    (vi) discharging said sulfur dioxide gas from said chambers; and
    (vii) converting said sulfur dioxide gas to liquid sulfur dioxide.

9. The process according to claim 8, wherein said zeolite is clinoptilolite.

10. The process according to claim 8, wherein said chambers contain alkalized alumina.

11. The process according to claim 8, wherein said step (iii) includes conducting said flue gas upwardly through said first fixed port and through said chambers while simultaneously conducting said air in step (iv) through said second fixed port and through said chambers.

* * * * *